United States Patent
Arellano

(10) Patent No.: US 9,676,359 B1
(45) Date of Patent: Jun. 13, 2017

(54) JUMP BRACKET TEMPSET CLIP FOR VEHICLE

(71) Applicant: Toyota Motor Engineering & Manufacturing North America, Inc., Erlanger, KY (US)

(72) Inventor: Nora Arellano, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 15/008,692

(22) Filed: Jan. 28, 2016

(51) Int. Cl.
*B60R 21/213* (2011.01)
*B60R 21/232* (2011.01)

(52) U.S. Cl.
CPC .......... *B60R 21/213* (2013.01); *B60R 21/232* (2013.01); *Y10T 24/45105* (2015.01)

(58) Field of Classification Search
CPC  B60R 21/213; B60R 21/232; Y10T 24/45105
See application file for complete search history.

(56) References Cited

U.S. PATENT DOCUMENTS

| | | | |
|---|---|---|---|
| 7,523,959 | B2 | 4/2009 | Kawai et al. |
| 7,694,999 | B2 * | 4/2010 | Siewiera ................. B60R 21/20 |
| | | | 24/458 |
| 8,317,246 | B2 | 11/2012 | Takeuchi et al. |
| 2005/0029778 | A1 | 2/2005 | Weber et al. |
| 2006/0066080 | A1 * | 3/2006 | Ikeda ................... B60R 21/213 |
| | | | 280/730.2 |
| 2011/0203081 | A1 * | 8/2011 | Iwahara .................. F16B 5/065 |
| | | | 24/458 |
| 2012/0131770 | A1 * | 5/2012 | Iwahara ................ F16B 21/086 |
| | | | 24/458 |
| 2013/0017033 | A1 * | 1/2013 | Brown .................... B60R 19/24 |
| | | | 411/112 |
| 2013/0117973 | A1 * | 5/2013 | Murasaki ............. A47C 31/023 |
| | | | 24/581.11 |

\* cited by examiner

*Primary Examiner* — Drew Brown
(74) *Attorney, Agent, or Firm* — Christopher G. Darrow; Darrow Mustafa PC

(57) ABSTRACT

A clip that can be attached to a jump bracket to align the jump bracket and the associated curtain side airbag (CSA) relative to the vehicle for attachment thereto. The clip is configured to be attached to an existing alignment member on the jump bracket and provide more restrained positioning in an alignment opening in the vehicle panel. The more restrained positioning facilitates the alignment of both first and second fastening features on the jump bracket with the associated fastening locations on the vehicle thereby providing a greater and more reliable ease of installation of the CSA. The clip can be configured to provide a datum for the proper alignment of the jump bracket relative to the vehicle.

20 Claims, 3 Drawing Sheets

JUMP BRACKET TEMPSET CLIP FOR VEHICLE

FIELD

The subject matter described herein relates in general to clips and, more particularly, to a clip for mounting a jump bracket during installation of a curtain side airbag on a vehicle.

BACKGROUND

Modern vehicles commonly have a variety of safety equipment to protect occupants. For example, inflatable restraints can be integrated with vehicle components located in the interior of the vehicle. The inflatable restraint can include an airbag attached to a vehicle rail, such as a curtain side airbag (CSA). In response to an activation event, a sensor can activate an inflator to generate an inflation gas that rapidly inflates an inflatable portion to facilitate protection of an occupant. The CSA can be attached to a jump bracket that is subsequently attached to the vehicle.

The CSA may utilize multiple attachments to the vehicle via the jump bracket. An alignment opening on the vehicle may be utilized to aid in positioning of the jump bracket on the vehicle while a first attachment member, such as a fastener, is installed. The engagement of the jump bracket with the alignment opening, however, may allow for some variability in the positioning of the jump bracket. As a result, the jump bracket may be misaligned and the installation of a second attachment member hindered. It can be cumbersome and time consuming to correct the misalignment.

SUMMARY

This invention relates to a clip that can be attached to a jump bracket to align the jump bracket and the associated curtain side airbag (CSA) relative to the vehicle for attachment thereto. The clip is configured to be attached to an existing alignment member on the jump bracket and provide more restrained positioning in an alignment opening in the vehicle panel. The more restrained positioning facilitates the alignment of both first and second fastening features on the jump bracket with the associated fastening locations on the vehicle thereby providing a greater and more reliable ease of installation of the CSA. The clip can be configured to provide a datum for the proper alignment of the jump bracket relative to the vehicle.

In one respect, the present disclosure is directed to a system for attaching an inflatable restraint to a vehicle. The system includes a bracket having an alignment member extending therefrom and configured to be loosely inserted into an alignment opening in a vehicle. The bracket has at least one mounting opening spaced apart from the alignment member. An inflatable restraint is operatively connected to the bracket. A clip is operatively connected to the alignment member. The clip is configured to be inserted into the alignment opening along with the alignment member. The clip has at least one resilient body member that resiliently deforms when passing through the alignment opening. The body member inhibits removal of the alignment member from the alignment opening and inhibits rotation of the bracket relative to the alignment opening prior to fixedly attaching the bracket to the vehicle. At least one fastener is operable to fixedly attach the bracket to the vehicle through the at least one mounting opening subsequent to the insertion of the alignment member and clip into the alignment opening.

In another respect, the present disclosure is directed to a vehicle. The vehicle includes a body having an alignment opening and at least two attachment openings. There is a bracket having an alignment member extending therefrom and configured to be loosely inserted into the alignment opening. The bracket has first and second mounting openings spaced apart from the alignment member and from one another. An inflatable restraint is operatively connected to the bracket. A clip is operatively connected to the alignment member. The clip is configured to be inserted into the alignment opening along with the alignment member. The clip has at least one resilient body member that resiliently deforms when passing through the alignment opening. The body member inhibits removal of the alignment member from the alignment opening and inhibits rotation of the bracket relative to the alignment opening prior to fixedly attaching the bracket to the vehicle. The engagement between the clip and the alignment opening allows the bracket to be oriented relative to the vehicle such that the mounting openings are aligned with the attachment openings. First and second fasteners fixedly attach the bracket to the vehicle through the respective first and second mounting openings subsequent to the insertion of the alignment member and clip into the alignment opening.

In yet another respect, the present disclosure is directed to a method of attaching an inflatable restraint to a vehicle. The method includes providing a bracket having an alignment member extending therefrom and configured to be loosely inserted into an alignment opening in the vehicle, the bracket having at least one mounting opening spaced apart from the alignment member. The method includes operatively connecting an inflatable restraint to the bracket and operatively attaching a clip to the alignment member. The clip has at least one resilient body member. The method further includes inserting the clip and alignment member into the alignment opening and resiliently deforming the body member when passing through the alignment opening. The method includes inhibiting removal of the alignment member from the alignment opening and inhibiting rotation of the bracket relative to the alignment opening with the engagement between the clip and the alignment opening. The method further includes aligning the at least one mounting opening with an attachment opening and fixedly attaching the bracket to the vehicle with at least one fastener and the at least one mounting opening.

DETAILED DESCRIPTION

This detailed description relates to a clip that can be attached to a jump bracket to align the jump bracket and the associated curtain side airbag (CSA) relative to the vehicle for attachment thereto. The clip is configured to be attached to an existing alignment member on the jump bracket and provide more restrained positioning in an alignment opening in the vehicle panel. The more restrained positioning facilitates the alignment of both first and second fastening features on the jump bracket with the associated fastening locations on the vehicle thereby providing a greater and more reliable ease of installation of the CSA. The clip can be configured to provide a datum for the proper alignment of the jump bracket relative to the vehicle.

Detailed embodiments are disclosed herein; however, it is to be understood that the disclosed embodiments are intended only as exemplary. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in the Figures, but the embodiments are not limited to the illustrated structure or application.

Figure 1:
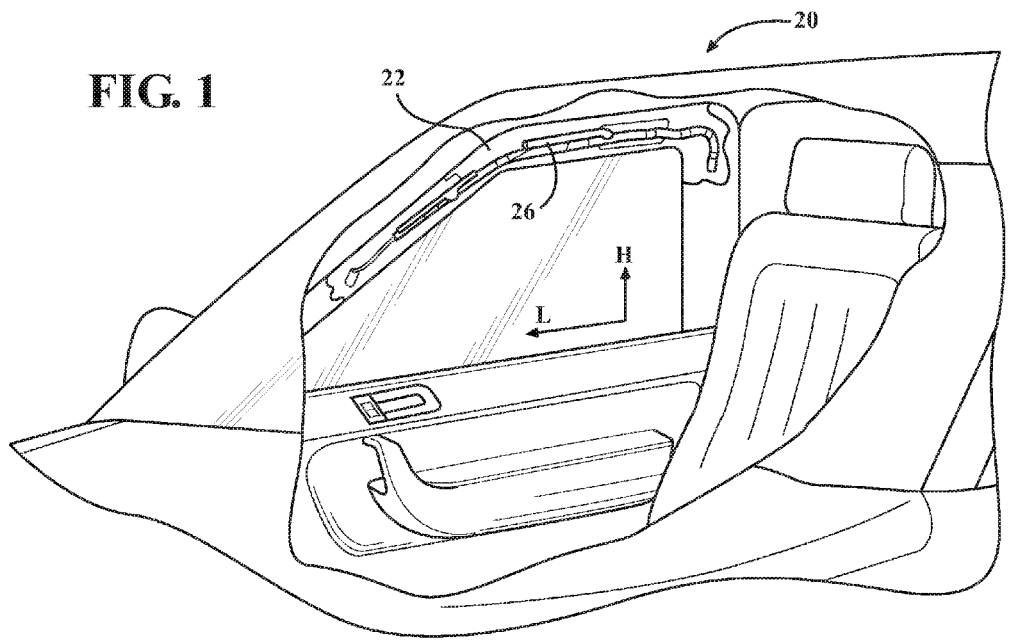
FIG. 1 is a portion of an example vehicle interior having a CSA attached to a side rail.
Figure 2:
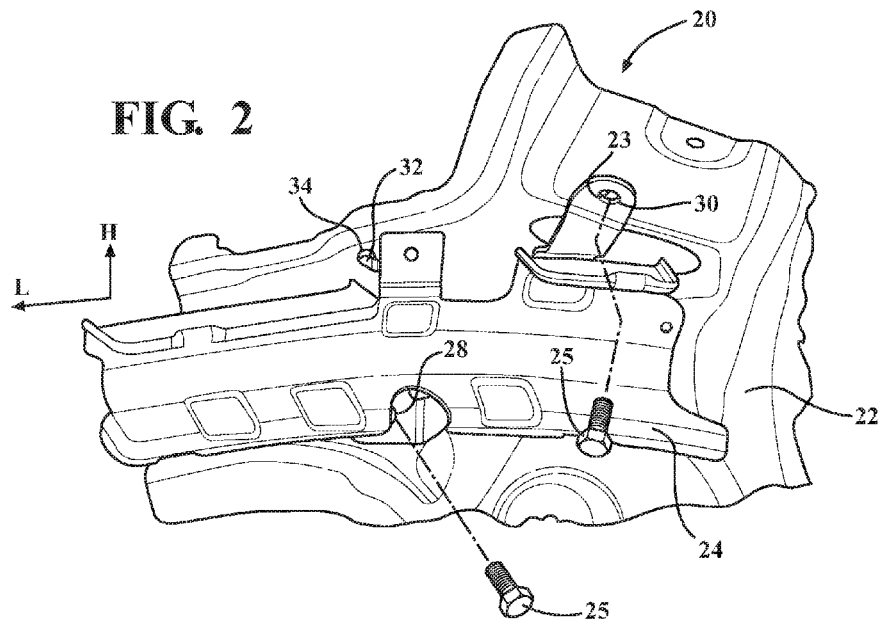
FIG. 2 is a fragmented view of jump bracket used to retain a CSA to the side rail.

Referring to FIGS. 1-2, an exemplary vehicle 20 having a side rail 22 is illustrated. Side rail 22 may have a plurality of openings 23 to facilitate attachment of a jump bracket 24, such as by the use of fasteners 25. Opening 23 may be on vehicle 20 (side rail 22) or may be in other components, such as mounting brackets (not shown), attached thereto. Jump bracket 24 may be utilized to attach components to vehicle 20, such as a curtain side airbag (CSA) 26. CSA 26 may be attached to bracket 24 in any well-known manner. Bracket 24 may have first and second openings 28, 30 that align with openings 23 on vehicle 20 to secure bracket 24 and CSA 26 to vehicle 20 in a desired location. Second opening 30 may be larger than first opening 28 to accommodate variations in manufacturing tolerances and alignment.

Figure 3:
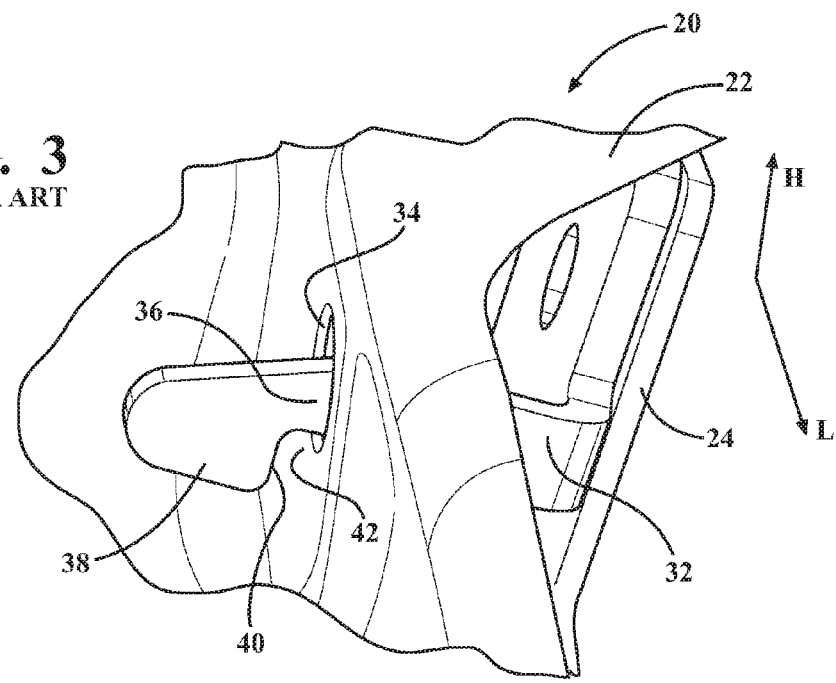
FIG. 3 is a fragmented view of the jump bracket of FIG. 2 without the clip showing the prior art engagement with the alignment opening.

Referring to FIGS. 2-3, bracket 24 includes an alignment member 32 that is configured to fit within and extend through an alignment opening 34 in vehicle 20. Alignment opening 34 may be on vehicle 20 (side rail 22) or may be in other components, such as mounting brackets (not shown), attached thereto. Alignment member 32 may include a neck portion 36 that extends outwardly from bracket 24. An enlarged head 38 having a shoulder 40 may be attached to neck portion 36. Head portion 38 is configured to extend through alignment opening 34 with shoulder 40 engaging with a back surface/side 42 of vehicle 20 adjacent alignment opening 34 to inhibit removal therefrom. Alignment member 32 is configured to allow bracket 24 to be suspended from alignment opening 34 while an installer moves bracket 24 into an orientation where first opening 28 is aligned with an opening 23 and a fastener 25 may be inserted therethrough to retain bracket 24 to vehicle 20. Subsequently, another fastener 25 is inserted through second opening 30 and an aligned opening 23 to further retain bracket 24 to vehicle 20. However, the loose fit (as shown in FIG. 3) between alignment member 32 and alignment opening 34 allow for variability in the positioning and second opening 30 may not be aligned with an opening 23 upon insertion of fastener 25 through first opening 28. As a result, the installer may need to loosen the installed fastener 25 and reorient bracket 24 so that second opening 30 is aligned with an opening 23 and a second fastener 25 can be inserted therethrough to retain bracket 24 to vehicle 20.

Figure 4:
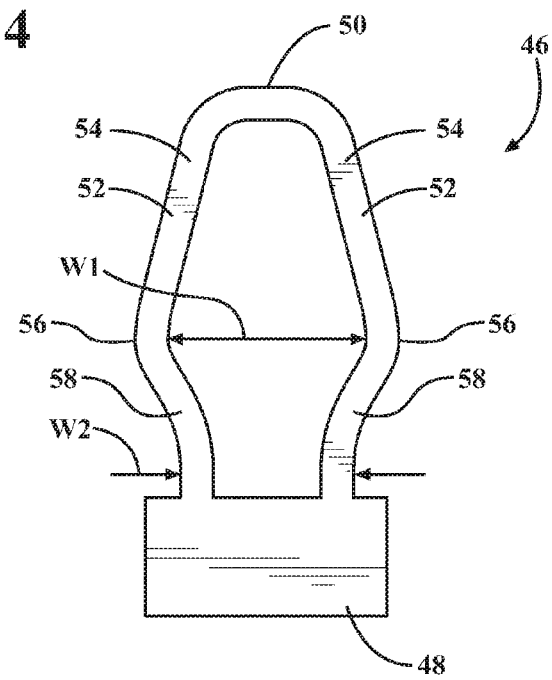
FIG. 4 is a plan view of the clip that can be utilized with the jump bracket of FIG. 2 for engagement with the alignment opening.
Figure 5:
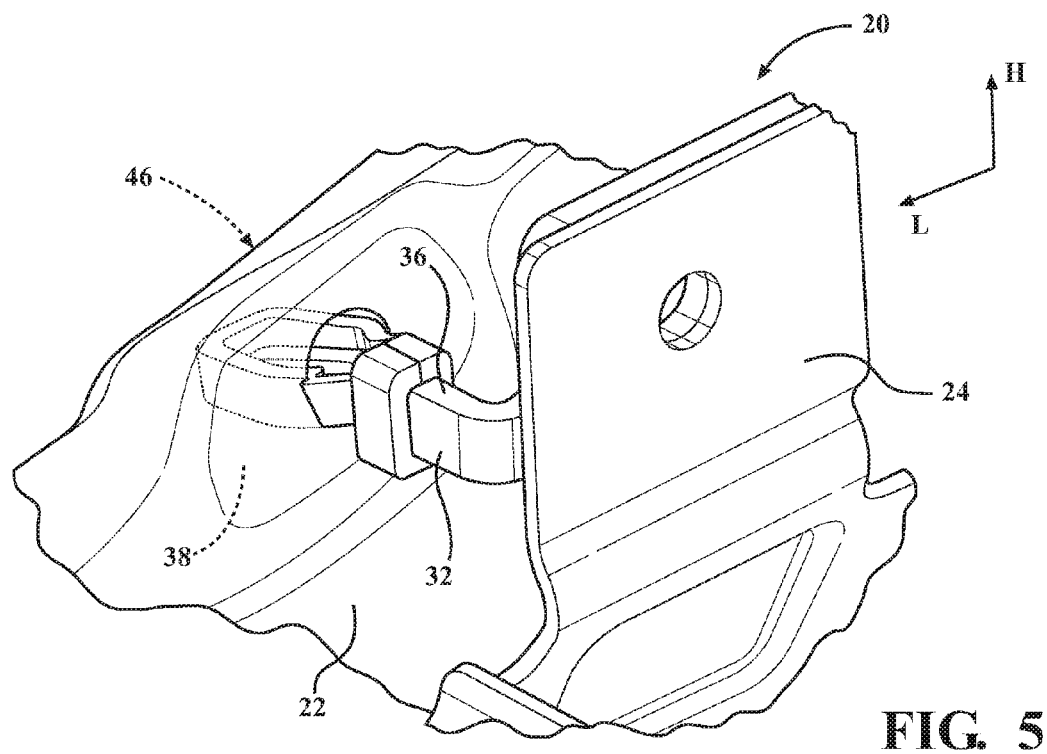
FIGS. 5 and 6 are fragmented perspective views of the clip of FIG. 4 attached to the jump bracket of FIG. 2 and engaged with the alignment opening in the vehicle.
Figure 6:
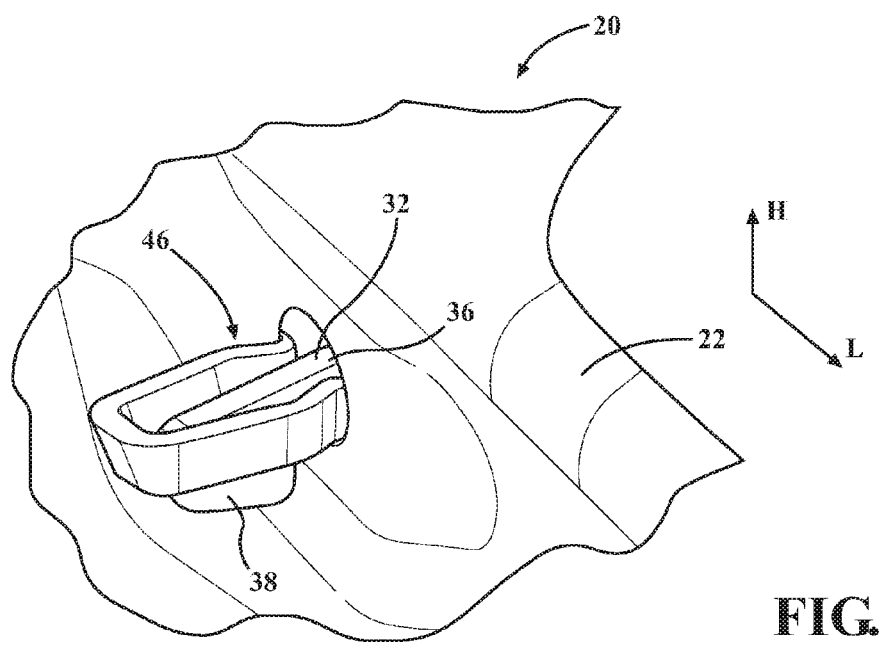

Referring now to FIGS. 4-6, an embodiment of a clip 46 according to the present invention is shown. Clip 46 is configured to be attached to alignment member 32 and provide a more restrained positioning in alignment opening 34. The more restrained positioning facilitates the alignment of both first and second openings 28, 30 with openings 23 thereby providing a greater and more reliable ease of installation of CSA 26. Clip 46 may be made of any suitable material, such as metal or plastic, and may be made by any suitable process, such as by stamping or molding. Clip 46 may be attached to alignment member 32 by any suitable arrangement such that clip 46 and alignment member 32 do not move relative to one another once attached together. By way of non-limiting example, clip 46 may be crimped onto alignment member 32.

Clip 46 includes a base 48 at one end and a head 50 at the opposite end with a pair of resilient intermediate body members 52 extending therebetween. Body members 52 may be mirror images of one another. Body members 52 may include leading portions 54, transition portions 56 and trailing portions 58. Leading portions 54 may extend away from one another as they extend from head 50 toward base 48 reaching a maximum relaxed width W1 at transition portions 56. Trailing portions may extend toward one another as they extend from transition portion 56 toward base 48 having a width W2 adjacent base 48. Head 50 is dimensioned to be smaller than alignment opening 34 to facilitate insertion therethrough along with alignment member 32. Width W1 is greater than a diameter of alignment opening 34 such that body members 52 resiliently deflect inwardly toward one another and leading portions 54 rub against alignment opening 34 when clip 46 and alignment member 32 are inserted therein and move outwardly away from one another toward their relaxed position after transition portions 56 have passed therethrough. Width W1 affects the insertion (and removal) force required to insert clip 46 and alignment member 32 into alignment opening 34. Base 48 is larger than alignment opening 34 such that base 48 may limit the degree to which clip 46 can be inserted into/through alignment opening 34. Width W2 is less than width W1 and may be about the same dimension as or less than the diameter of alignment opening 34. When fully inserted into alignment opening 34, base 48 is on one side of alignment opening 34 while head 50 on the other and trailing portions 58 are engaged with alignment opening 34.

Clip 46 provides a more restrained positioning in alignment opening 34 and thereby facilitates proper attachment of CSA 26 to vehicle 20. Engagement of trailing portions 58 with alignment opening 34 inhibits rotation of clip 46 and bracket 24 relative to vehicle 20. Additionally, the engagement of trailing portions 58 with alignment opening 34 also provides a datum along the L direction. The width W2 may be configured to provide a desired positioning of bracket 24 relative to the L direction. As a result, the alignment of first opening 28 with the appropriate opening 23 controls the positioning in the H direction and when fastener 25 is installed in first opening 28, second opening 30 is aligned with an appropriate opening 23 so that the installer may then insert another fastener 25 to secure CSA 26 to vehicle 20. This eliminates the possibility of misalignment and the subsequent re-work required for correction.

To install CSA 26, an installer will align alignment member 32 and the clip 46 thereon with alignment opening 34 and bracket 24 generally in the desired orientation relative to vehicle 20. The installer will then push alignment member 32 and clip 46 into alignment opening until transition portions 56 of body members 52 have passed therethrough and base 48 contacts the surface adjacent alignment opening 34. Clip 46 inhibits removal from alignment opening 34. The installer will rotate, if needed, bracket 24 relative to vehicle 20 until first opening 28 is aligned with an appropriate opening 23. Clip 46 will inhibit but not prevent this rotation provided a sufficient rotational force is applied (a rotational force greater than that applied by gravity acting on bracket 24 and CSA 26 attached thereto). A fastener 25 will then be installed to secure bracket 24 to vehicle 20. As described above, the use of clip 46 should result in second opening 30 being aligned with an appropriate opening 23 such that the installer may then install another fastener 25 through second opening 30 to finish securing bracket 24 and CSA 26 to vehicle 20.

It should be appreciated that while bracket 24 is described and shown as having two openings 28, 30 and being secured to vehicle 20 with two fasteners 25, a single fastener 25 and a single opening may be utilized to secure bracket 24 to vehicle 20. Additionally, more than two fasteners 25 and two openings 28, 30 may be utilized if desired.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g. AB, AC, BC or ABC). The term "operatively connected" as used throughout this description, can include direct or indirect connections, including connections without direct physical contact.

Aspects herein can be embodied in other forms without departing from the spirit or essential attributes thereof. Accordingly, reference should be made to the following claims, rather than to the foregoing specification, as indicating the scope of the invention.

What is claimed is:

1. A system for attaching an inflatable restraint to a vehicle, the system comprising:
   a bracket having an alignment member extending therefrom and configured to be loosely inserted into an alignment opening in a vehicle, the bracket having at least one mounting opening spaced apart from the alignment member;
   an inflatable restraint operatively connected to the bracket;
   a clip operatively connected to the alignment member, the clip configured to be inserted into the alignment opening along with the alignment member, the clip having at least one resilient body member that resiliently deforms when passing through the alignment opening, the body member inhibiting removal of the alignment member from the alignment opening and inhibiting rotation of the bracket relative to the alignment opening prior to fixedly attaching the bracket to the vehicle; and
   at least one fastener operable to fixedly attach the bracket to the vehicle through the at least one mounting opening,
   wherein the at least one fastener fixedly attaches the bracket to the vehicle subsequent to the insertion of the alignment member and clip into the alignment opening.

2. The system of claim 1, wherein the at least one body member is a pair of body members that resiliently deform during insertion into the alignment opening.

3. The system of claim 2, wherein the body members extend from a head toward a base, the body members taper away from one another and then toward one another as they extend from the head toward the base, the body members having a maximum relaxed width at a transition area between tapering away and tapering toward, the maximum width being greater than a diameter of the alignment openings.

4. The system of claim 3, wherein engagement of the body members with the alignment opening provides a directional datum for the bracket relative to the vehicle.

5. The system of claim 4, wherein the body members have a second width adjacent the base, the second width being less than the maximum width and being larger than or the same size as the diameter of the alignment opening.

6. The system of claim 1, wherein
   the at least one mounting opening includes first and second mounting openings spaced apart from the alignment member and from one another,
   the at least one fastener includes first and second fasteners operable to fixedly attach the bracket to the vehicle through the respective first and second mounting openings, and
   the first and second fasteners fixedly attach the bracket to the vehicle subsequent to the insertion of the alignment member and clip into the alignment opening.

7. The system of claim 1, wherein the clip is clinched onto the alignment member.

8. The system of claim 1, wherein the attachment of the at least one fastener sets a vertical position of the bracket relative to the vehicle.

9. A vehicle, comprising:
   a body having an alignment opening and at least two attachment openings;
   a bracket having an alignment member extending therefrom and configured to be loosely inserted into the alignment opening, the bracket having first and second mounting openings spaced apart from the alignment member and from one another;
   an inflatable restraint operatively connected to the bracket;
   a clip operatively connected to the alignment member, the clip configured to be inserted into the alignment opening along with the alignment member, the clip having at least one resilient body member that resiliently deforms when passing through the alignment opening, the body member inhibiting removal of the alignment member from the alignment opening and inhibiting rotation of the bracket relative to the alignment opening prior to fixedly attaching the bracket to the vehicle, the engagement between the clip and the alignment opening allowing the bracket to be oriented relative to the vehicle such that the mounting openings are aligned with the attachment openings; and
   first and second fasteners operable to fixedly attach the bracket to the vehicle through the respective first and second mounting openings,
   wherein the first and second fasteners fixedly attach the bracket to the vehicle subsequent to the insertion of the alignment member and clip into the alignment opening.

10. The vehicle of claim 9, wherein the at least one body member is a pair of body members that resiliently deform during insertion into the alignment opening.

11. The vehicle of claim 10, wherein the body members extend from a head toward a base, the body members taper away from one another and then toward one another as they extend from the head toward the base, the body members having a maximum relaxed width at a transition area between tapering away and tapering toward, the maximum width being greater than a diameter of the alignment openings.

12. The vehicle of claim 11, wherein engagement of the body members with the alignment opening provides a datum for the bracket relative to the vehicle.

13. The vehicle of claim 12, wherein the datum is a datum relative to a fore and aft length of the vehicle.

14. The vehicle of claim 12, wherein the body members have a second width adjacent the base, the second width being less than the maximum width and being larger than or the same size as the diameter of the alignment opening.

15. The vehicle of claim 9, wherein the clip is clinched onto the alignment member.

16. The vehicle of claim 9, wherein the attachment of the first fastener sets a vertical position of the bracket relative to the vehicle.

17. A method of attaching an inflatable restraint to a vehicle, the method comprising:
   providing a bracket having an alignment member extending therefrom and configured to be loosely inserted into an alignment opening in the vehicle, the bracket having at least one mounting opening spaced apart from the alignment member;
   operatively connecting an inflatable restraint to the bracket;
   operatively attaching a clip to the alignment member, the clip having at least one resilient body member;
   inserting the clip and alignment member into the alignment opening;
   resiliently deforming the body member when passing through the alignment opening;
   inhibiting removal of the alignment member from the alignment opening and inhibiting rotation of the bracket relative to the alignment opening with the engagement between the clip and the alignment opening;
   aligning the at least one mounting opening with an attachment opening; and
   fixedly attaching the bracket to the vehicle with a fastener and the at least one mounting opening.

18. The method of claim 17, further comprises providing a directional datum for the bracket relative to the vehicle with engagement between the clip and the alignment opening.

19. The method of claim 18, wherein providing a directional datum includes providing a directional datum relative to a fore and aft length of the vehicle.

20. The method of claim 19, wherein attachment of the fastener sets a fixed vertical position of the bracket relative to the vehicle.

* * * * *